(12) United States Patent
Papierniak et al.

(10) Patent No.: US 7,802,722 B1
(45) Date of Patent: Sep. 28, 2010

(54) TECHNIQUES FOR MANAGING FRAUD INFORMATION

(75) Inventors: Karen Papierniak, Fenton, MI (US);
Linette Draper, Escondido, CA (US);
Paul Cereghini, San Diego, CA (US);
George R. Hood, San Diego, CA (US);
Mike Chiufang Hsiao, San Diego, CA
(US); Gordon D. Brooks, San Marcos,
CA (US); Brian J. Wasserman,
Escondido, CA (US); Thomas K. Ryan,
Valley Center, CA (US)

(73) Assignee: Teradata US, Inc., Miamisburg, OH (US)

( * ) Notice: Subject to any disclaimer, the term of this patent is extended or adjusted under 35 U.S.C. 154(b) by 810 days.

(21) Appl. No.: 11/027,792

(22) Filed: Dec. 31, 2004

(51) Int. Cl.
*G06K 5/00* (2006.01)
(52) U.S. Cl. .................. 235/382; 235/376; 235/380; 235/487
(58) Field of Classification Search .......... 235/375, 235/376, 380, 382, 487; 705/39, 44; 707/9
See application file for complete search history.

(56) References Cited

U.S. PATENT DOCUMENTS

| 5,768,354 | A | 6/1998 | Lange et al. |
|---|---|---|---|
| 5,819,226 | A | 10/1998 | Gopinathan et al. |
| 6,163,604 | A | 12/2000 | Baulier et al. |
| 6,535,728 | B1 | 3/2003 | Perfit et al. |
| 6,587,552 | B1 | 7/2003 | Zimmermann |
| 6,601,048 | B1 | 7/2003 | Gavan et al. |
| 2006/0149674 | A1* | 7/2006 | Cook et al. ............ 705/44 |
| 2006/0200467 | A1* | 9/2006 | Ohmori et al. ......... 707/9 |

* cited by examiner

*Primary Examiner*—Seung H Lee
(74) *Attorney, Agent, or Firm*—Schwegman, Lundberg & Woessner

(57) ABSTRACT

Techniques are presented for managing fraud information. Metadata defines user profiles, security levels, fraud cases, and presentation information. One or more queries or reports are processed against disparate data store tables and the results are aggregated into a repository. The repository is also defined by the metadata. Furthermore, operations associated with sharing, viewing, and accessing the results from the repository is defined and controlled by the metadata. In an embodiment, portions of the metadata may be viewed and navigated in a hierarchical and graphical formatted presentation.

6 Claims, 3 Drawing Sheets

TECHNIQUES FOR MANAGING FRAUD INFORMATION

FIELD

The invention relates generally to data processing, and more particularly to techniques for managing fraud information.

BACKGROUND

Insurance fraud is a growing concern for insurance companies. Fraud has become pervasive and is not strictly limited to the insured. In fact, in the health care industry a growing number of health care providers have been actively and systematically participating in insurance fraud schemes. As a result, insurance rates have skyrocketed and have showed no signs of abatement.

One problem with insurance fraud detection is that insurance investigators may be employed or may be active in different industries (e.g., healthcare, car insurance, home insurance, etc.) and/or may be employed by different insurance companies within the same industry. As a result, a fraud scheme which may span different industries or which may be employed by an individual known to one company but not known to another company may go undetected. This is so, because the data stores associated with industries and companies are often in different formats from one another, such that even if the information is shared between multiple data stores, it may still take an unreasonable amount of time to manually assimilate the information between the different data stores. Thus, a perpetrator of the fraud may be long gone before the situation is ever detected by an investigator.

In fact, data store disparity may and often does exist within the same insurance company, such as when a large insurance company has a plurality of divisions or regions and each division or region has its own unique data store collection and storage system. This is particularly true with a growing number of insurance companies that have merged with one another in recent years. During organizational mergers, the integration of data collection and storage is a long and continuous process or is often an exercise that is abandoned altogether due to expense. In situations like this, companies often attempt to integrated data through periodic extractions and manual analysis between their disparate data sources. However, this is an untimely exercise and is often much too late to catch a fraud perpetrator.

Problems with managing fraud data are compounded when a particular data store adds new fields, modifies label or field names, and/or removes existing fields. When this occurs, any other data store which attempts to manually and periodically integrate with the modified data store must also be adjusted to proper account for the changes. These types of modifications also alter reports. Furthermore, some reports are used for purposes of litigation and often require that they be reproduced in previous or older formats. As a result, integration is never truly achieved and if integration is achieved it is achieved at an enormous expense and is frequently untimely.

In still other situations, one fraud investigator may deploy a particular set of fraud patterns which is different from another fraud investigator's fraud patterns. Consequently, when the two fraud investigators attempt to share patterns and data sources, their integration is a difficult and timely exercise.

In yet other situations, data sources which are capable of being shared are generally not shared because of privacy and security concerns and because of the inability of one or more parties to properly integrate and ensure privacy or security to the satisfaction of the other party.

Therefore, there is a need for improved techniques managing fraud information.

SUMMARY

In various embodiments, techniques for managing fraud information are provided. In an embodiment, metadata is derived from a first data store table having a first format and from a second data store table having a second format. A fraud case is associated with a query and the metadata. When the query is executed against the first and second data store tables, the results are presented in accordance with the dictates of the metadata. In an embodiment, a repository is used to house the results, the metadata, and the query. The repository may be viewed as an archiving mechanism.

DETAILED DESCRIPTION

Figure 1:
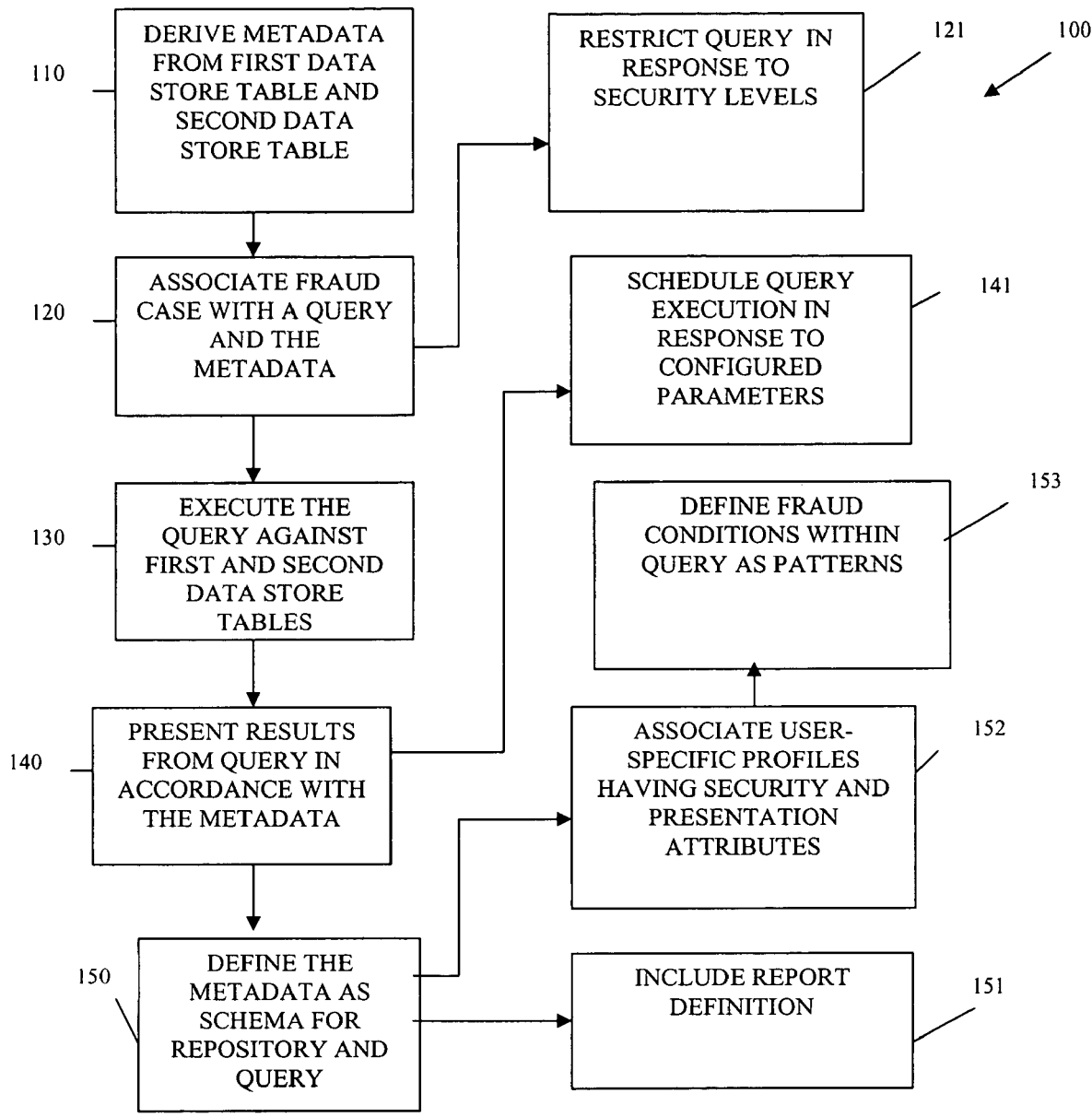
FIG. 1 is a diagram of method for defining a fraud case within a data store table, according to an example embodiment.

FIG. 1 is a diagram of method 100 for defining a fraud case within a data store table, according to an example embodiment. The method 100 (herein after "fraud investigation service") is implemented in a machine-accessible and readable medium. In an embodiment, the fraud investigation service is implemented as a service associated with the Teradata® product, distributed by NCR Corporation of Dayton, Ohio. Of course it is understood that the fraud investigation service may be implemented within or interfaced to any data store (e.g., database, directory, data warehouse, or various combinations of the same).

Initially, two or more data stores having tables house a variety of insurance-related data. Some of this data may include claims data and/or diagnostic codes associated with insurance claims. The claims may be associated with any type of insurance (e.g., health, car, homeowners, business, disability, etc.). Each data store includes its own schema defining its tables and fields for the insurance data that it houses. In an embodiment, at least two of the data stores are disparate from one another. This means that the format or fields of the data stores are different from one another.

At 110, metadata is derived from a first data store table having a first format and a second data store table having a second format. One technique for achieving this is to use an Extensible Markup Language (XML) schema to map fields of the first data store to similar or like fields of the second data store table and combine the mapped fields into a single field of the metadata. In an embodiment, the derivation, at 110, may occur in an automated fashion by processing a schema associated with the first format and the second format in order to map the first and second formats into a format associated with the metadata. In this way, the metadata may define views for the query results and fields may be combined or renamed from the first and second tables in the views.

At 120, a fraud case or situation is defined and associated or linked to a query and the metadata. The query defines a pattern or condition that an insurance investigator believes to represent a fraud event. The format of the query may be generic or may be in a specific query language, such as SQL. In an embodiment, one or more interfaces may permit an insurance investigator to select predefined patterns or fields from a list of available patterns or fields and to construct the query in a semi-automated fashion. The metadata and the query combine to form a definition for the fraud case. In some embodiments, at 121, the fields selected for the query and the tables used may be restricted in response to security levels associated with users that attempt to create the query. Moreover, the query may be modified or altered by users having the appropriate authorization.

At 130, and once the query is ready to be executed, the fraud investigation service translates the query into a query syntax that is accepted by the first data store table and into a query syntax that is accepted by the second data store table. The queries are then submitted or executed against both the first and second data store tables. At 140, the results from the queries are presented as the pre-defined fields of a repository according to dictates included in the metadata and are made available for viewing and manipulation by a fraud investigator (e.g., user).

In an embodiment, at 141, the query may be scheduled for execution against the first and second data store tables in response to configured parameters associated with the fraud case being managed by the fraud investigation service. The parameters may be carried as metadata or as separate command line parameters for the fraud case. Additionally, the parameters may explicitly define when a query is to be executed or may define that the query is executed upon the detection of a predefined event or condition.

In an embodiment, at 150, the fraud investigation service initially defines the metadata as a repository or its schema and the query. The metadata may also include, at 151, one or more report definitions associated with reports. In addition, at 152, metadata may include user-specific profiles. The profiles may include security permissions or levels and presentation attributes. If some fields are not accessible to a particular user based on security levels, then these fields are not acquired and returned from the query from the first and second data stores. In some embodiments, interfaces may permit the user to select fields to be presented from the query results, assuming security levels permit the selected fields to be presented to the user.

Again, at 153, fraud conditions for the fraud case may be defined within the query as patterns. For example, a query may look for patients that have used more than one health care provider in the last month to acquire a prescription for pain medication. This query identifies a pattern of behavior for insured patients that may be potentially addicted to medication and improperly using health care providers to assist them in their addictions. Moreover, patterns that may not be easily created by a fraud investigator may be created by a database analyst and entered directly into the metadata. Thus, a user can execute the pattern and at runtime enter any desired parameters associated with variables of the pattern. Still further, the results of one query or pattern may be used as input into another query or pattern. In this manner, patterns and queries may be hierarchical or dependent on one another and stacked together for processing. A variety of other patterns may be expressed in query format for purposes of detecting potential fraud situations. All such patterns are intended to be covered with the tenets presented herein.

The fraud investigation service may be used in a variety of beneficial manners for purposes of improving the management of fraud information and navigation of that fraud information. In an embodiment, metadata is used to define a fraud case. The metadata drives the processing actions of the fraud investigation service for purposes of defining fraud patterns, acquiring results data, populating the results data into a repository, and managing views associated with the results data.

In some embodiments, front-end interfaces may be added to the fraud investigation service (e.g., Java-based World-Wide Web (WWW) pages, etc.) which allow a user to create and modify fraud cases that the fraud investigation service manages. The fraud cases may be defined as queries, reports, results, patterns, templates, etc. Queries may be custom scheduled for execution and access to the fields, queries, and results may be restricted based on security levels. In some cases, some portions of the results may be made publicly available for viewing while other portions of the results may be made private and available to specific users, who possess the proper security level.

Figure 2:
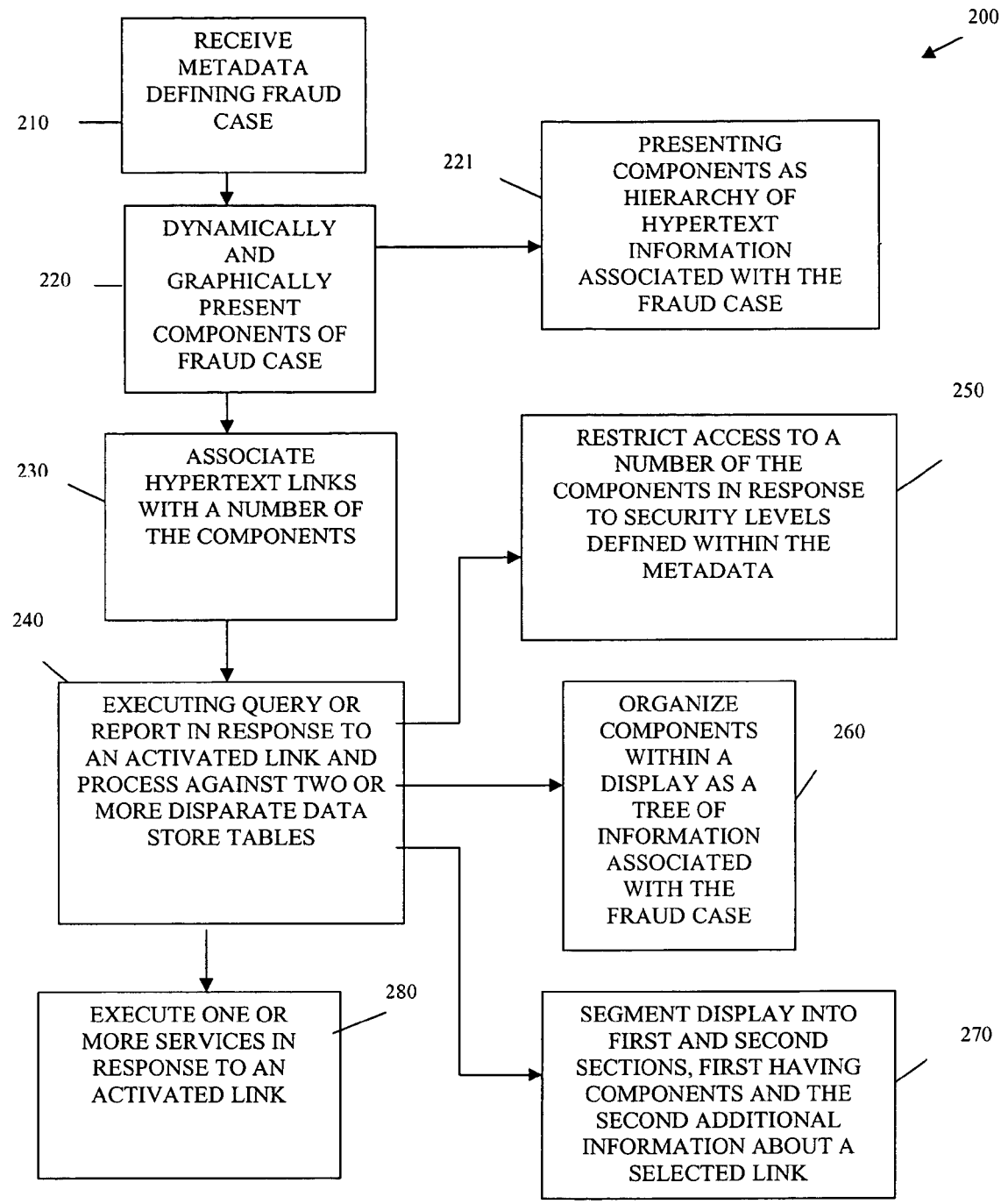
FIG. 2 is a diagram of method for dynamically and graphically presenting and navigating a fraud case, such as a fraud case defined by the processing depicted in FIG. 1, according to an example embodiment.

FIG. 2 is a flowchart of a method 200 for dynamically presenting and navigating a fraud case, such as a fraud case defined by the processing depicted in FIG. 1, according to an example embodiment. The method 200 (hereinafter referred to as "viewing service") is implemented in a machine-accessible and readable medium and is accessible over a network. The network may be wired, wireless, or a combination of wired and wireless. In an embodiment, the viewing service interacts with the fraud investigation service of the method 100 to provide navigation and viewing features to a user that desires to navigate and view information associated with a fraud case.

At 210, metadata is received that defines a fraud case. In an embodiment, the metadata is similar to the metadata managed and created by the fraud investigation service represented by the processing of the method 100 of FIG. 1. The metadata may be created via interfaces that cooperate with the fraud investigation service represented by the method 100 of FIG. 1. In some embodiments, the metadata may be copied as a template from another instance of the metadata and then modified with an interface.

The viewing service also allows a user to copy, paste, and delete queries, reports, results, templates, and the like from one case, user, and/or library to another case, user, and/or library. The object level movement allows fraud investigators to share and reuse fraud investigation scenarios.

At 220, the viewing service dynamically and graphically presents components of information related to the fraud case within a display. In an embodiment, the presentation of the components occurs within one or more WWW browser pages. In some embodiments, the presentation of these components may be driven by Extensible Markup Language Style Sheets (XSL), where the components themselves are defined in an XML file.

In an embodiment, at 221, the viewing service presents the components as a hierarchy of hypertext information that is associated with the fraud case. The hierarchy may be navigated by activating links associated with the hypertext information. Thus, components may be expanded or collapsed based on link activation. The link information associated with various components may be carried in the metadata or dynamically resolved when the components are acquired from information contained in the metadata.

For example, suppose one component is a fraud pattern identified by a label. The label is identified as the component and when the component is activated via a hypertext link, the query is processed. The results from the query are then housed in a repository and made available via another link or another view of the fraud information. The location to the results and the command to process the query may be constructed from information contained in the metadata and from information that is dynamically resolved.

At 230, the viewing service associates hypertext links with a number of the components within the display presentation. That is, some links may expand into additional information while other links when activated may process one or services. Example services can include importing results from queries into spreadsheet formats, importing results into word processor formats, notifying interested parties via a mail or messaging service of detected fraud conditions, and the like.

At some point during processing, a hypertext link will be activated that executes a query. Accordingly, at 240, when a specific link is activated a query is executed. The query processes against two or more disparate data store tables in the manners discussed above with respect to the method 100 of FIG. 1. The results associated with the query may identify potential fraud situations. In some cases, some of the results data may be sensitive or private. Accordingly, at 250, access and/or viewing of certain components may be restricted in response to security levels or attributes defined in the metadata.

In an embodiment, at 260, the components may be organized within a display as a tree of information associated with the fraud case. The tree is hierarchical and expands into child components and collapses into parent components. The tree may be presented within the display and navigated. In an embodiment, the navigation and presentation occurs within one or more WWW browser pages, where each node of the tree is one of the components associated with the fraud case and where some of the components are hypertext links and defined from within the metadata.

In still another embodiment, at 270, the presentation display may be segmented into two sections. The first section depicts the components and their hypertext links and the second section depicts additional information associated with a currently selected components located within the first section. The two sections may be adjacent to one another in a horizontal fashion or may be adjacent to one another in a vertical fashion within the display.

As was mentioned above and in some embodiments, some links when activated may fork or spawn off the execution or invocation of another service. Thus, at 280, when some links are activated a service may be processed, such as a spreadsheet, word processor, messaging service, mail service, etc.

The viewing service dynamically pulls fraud information associated with fraud cases from a plurality of data stores or data sources and generates a hierarchical or tree data structure that includes hypertext links. The components of fraud information are defined within metadata. Some of the metadata may define what components are viewable, access levels for the components, and the like. The navigation and presentation of the fraud information are also defined within the metadata and processed by the viewing service to present the fraud information to a user.

In an embodiment, the metadata may also define or identify by reference a case object that includes information related to the fraud cases. A case object may logically include things such as, users associated with a fraud case, resources used by the fraud case, services used by the fraud case, security associated with the fraud case, parties involved with the fraud case, data sources having information related to the fraud case, and the like. In this manner, all relevant information to a particular fraud case may be encapsulated into a logical data object (fraud case object). References to the case object may be included within the metadata and the viewing service may access methods of the case object to acquire security information and other information for purposes of displaying the components of the case object.

It should also be pointed out that the viewing service may facilitate the navigation and viewing of fraud information from a more global perspective. Thus, enterprise data warehouses may be navigated, users associated with investigators may be navigated, fraud cases may be navigated, and fraud case objects may be navigated. All the relationships between users, data sources, fraud cases, and fraud information may be encapsulated, referenced, abstracted, and/or expressed within the metadata. The viewing service is capable of interpreting, parsing, and consuming the metadata for purposes of presenting the fraud information and permitting navigation of that fraud information. Thus, the fraud information may be viewed from the top down by a user from a variety of different perspectives (e.g., by user, by data store, by fraud case, by fraud case object, etc.).

Figure 3:
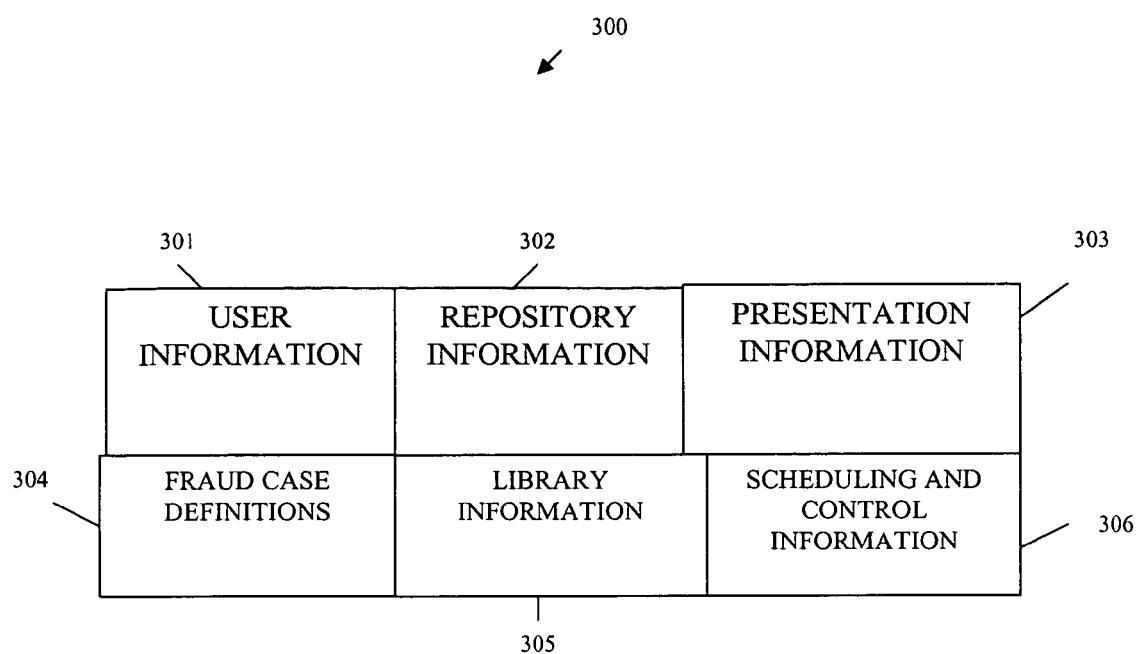
FIG. 3 is a diagram of a metadata data structure for defining a fraud case, according to an example embodiment.

FIG. 3 is a diagram of a metadata data structure 300 for defining a fraud case, according to an example embodiment. The metadata data structure 300 is implemented in a machine-accessible or readable medium, such as a computer-readable medium, and is accessible over a network. The network may be wired, wireless, or a combination of wired and wireless. In an embodiment, the metadata data structure 300 serves as the backbone or platform for the fraud investigation service represented by the method 100 of FIG. 1 and the viewing service represented by the method 200 of FIG. 2.

The metadata data structure 300 includes user information 301, repository information 302, and presentation information 303. In an embodiment, the metadata data structure 300 may also include fraud case definitions 304, library information 305, and/or scheduling and control information 306.

In an embodiment, the metadata data structure 300 may be expressed in a portable language format, such as XML. In this way, XML parsers, XSL applications, XSL definitions (XSD), and XSL transformers (XSLT) may be used to help define, parse, and process the metadata data structure 300. A variety of custom interfaces, such as WWW browser pages may be used to initially create and modify the metadata data structure 300. In some instances, the metadata data structure 300 may be initially created as a template from another metadata data structure 300.

The user information 301 may include such things as the identity of user, a user's authentication technique (e.g., certificate, password, digital signature, etc.), a user's security level, contact information associated with a user, and the like. The user's information 301 may also include preferences or profiles defined by a particular user.

The repository information 302 includes a schema for one or more data store tables that house query results, report results, and other fraud information that may be collected and logically associated by a user. The repository information 302 may also identify the sources of data information and queries associated with fraud patterns for fraud cases which are executed against the sources of data.

In an embodiment, the repository information 302 may be referred to as sandboxes of a user. The repository information 302 defines a schema for housing a user's results sets, persistent data, queries, reports, templates, etc.

Persistent data may include headers or labels associated with reports, which in the native data stores may change over time or be slightly reworded. In many cases, there may be a desire to prevent labels and header information from being changed.

For example, suppose that a report was provided to an insured a few years ago and litigation has since ensued with respect to the insured. During litigation, the ability to produce an exact or identical replica of the report, which was provided to the insured years ago, is vital; but, if field names and other report information have changed this may not be possible. However, the persistent data included with the repository information 302 can produce an exact report, since the state of the original data stores is not needed and since the metadata data structure 300 can cooperate with the fraud investigation service of FIG. 1 and the viewing service of FIG. 2 to reproduce the report. Stated another way, the state of the original data store may have changed since an original report issued and that state may not have been entirely saved, but all the fields in the original query were saved, such that the report may be accurately reproduced even when the state of the data store has changed.

The presentation information 303 includes information related to a user's navigation and viewing of fraud information. In a sense, it is the entry point for users into the fraud investigation service of FIG. 1 and it facilitates the processing of the viewing service of FIG. 2. The presentation information 303 permits data from several different data sources or tables to be presented in a single generic data store table with a variety of customized views. Security may also be associated with the views and data fields, which are associated with the presentation information 303.

In an embodiment, the metadata data structure 300 may also include fraud case definitions 304. These definitions may define fraud patterns associated with known fraud conditions or situations. The patterns may be expressed as queries that process against the plurality of data sources in order to mine them for fraudulent practices.

In another embodiment, the metadata data structure 300 also includes library information 305. The library information 305 acts as a clearing house for information that is desired to be transferred between different instances of the metadata data structure 300. Security attributes permit reading and writing against the library information 305. The library information 305 permits definitional information or presentation information 303, associated with the metadata data structure 300, to be transferred, copied, and/or shared for purposes of creating other instances of the metadata data structure 300. Thus, selective portions of the metadata data structure 300 may be used to create new copies or instances of the metadata data structure 300.

In still another embodiment, the metadata data structure 300 includes scheduling and control information 306. The scheduling and control information 306 permits defining when queries, related to fraud cases, will be executed. These definitions may be explicit or may be expressed in terms of conditions or events that when detected execute the appropriate queries against the data sources. The scheduling and control information 306 may also define when and how reports or other services are processed. Some control information may also be associated with security for the users.

The metadata data structure 300 permits fraud cases and fraud case objects to be defined and managed by fraud investigation services, such as the fraud investigation service described above with respect to the processing of the method 100 of FIG. 1. Moreover, the metadata data structure 300 permits fraud cases and fraud case objects to be navigated, presented, and processed by viewing services, such as the viewing service described above with respect to the processing of the method 200 of FIG. 2.

It has now been demonstrated how fraud information may be managed, navigated, and viewed in manners that are more timely and more integrated than what is conventionally done. This permits fraud investigators (users) to share information in a more seamless manner and to therefore more timely detect fraudulent situations. Additionally, the techniques presented herein permit data to remain persistent such that reports may be recreated and reproduced in identical formats as original reports. This is beneficial with respect to litigation that often occurs with insurance claims. Additionally, the techniques permit fraud cases or metadata to be copied and shared. This facilitates template creation related to fraud cases and improves ease of use.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A metadata data structure implemented in a computer-readable medium for defining a fraud case, the metadata structure executed computer-implemented services that are processed by a computer and the metadata data structure includes:

user information for a fraud investigator that is designated as a user;

repository information; and presentation information, wherein the user information includes authentication and security levels associated with the fraud investigator and the authentication information includes the identity of the fraud investigator and an authentication technique for authenticating the fraud investigator, and wherein the user information includes preferences and profiles defined by the user and contact information associated with the user, the repository information includes schemas for tables that house query results and report results, and schemas for templates accessed by the fraud investigator for fraud cases, the repository information also identifying sources of data information and specific queries associated with fraud patterns for the fraud cases, and wherein the presentation information defines customized views for and interfaces associated with the fraud investigator and the fraud cases, wherein the presentation information permits data from several different data sources or tables to be presented in a single generic data store table as the customized views for the fraud investigator.

2. The metadata data structure of claim 1 further comprising, fraud case definitions associated with the fraud investigator and each fraud case, wherein each fraud case definition is associated with one or more queries, and wherein the queries when executed are processed against two or more disparate data stores to look for predefined patterns associated with fraud.

3. The metadata data structure of claim 1, wherein the security levels associated with the repository information are modifiable by the fraud investigator to permit other fraud investigators to view selective portions of the repository information.

4. The metadata data structure of claim 1 further comprising, library information that permits definitional information of the repository information and presentation information to be transferred or to be shared with other instances of the metadata data structures.

5. The metadata data structure of claim 4, wherein the library information permits selective portions of the metadata data structure to be copied to a new and different instances of the metadata data structure.

6. The metadata data structure of claim 1 further comprising, scheduling and control information associated with queries and reports of the fraud investigator and the fraud cases.

\* \* \* \* \*